Aug. 8, 1972     T. H. FAIRBANKS     3,682,760
ORIENTED WEBS AND METHOD FOR MAKING THE SAME
Filed Oct. 8, 1970
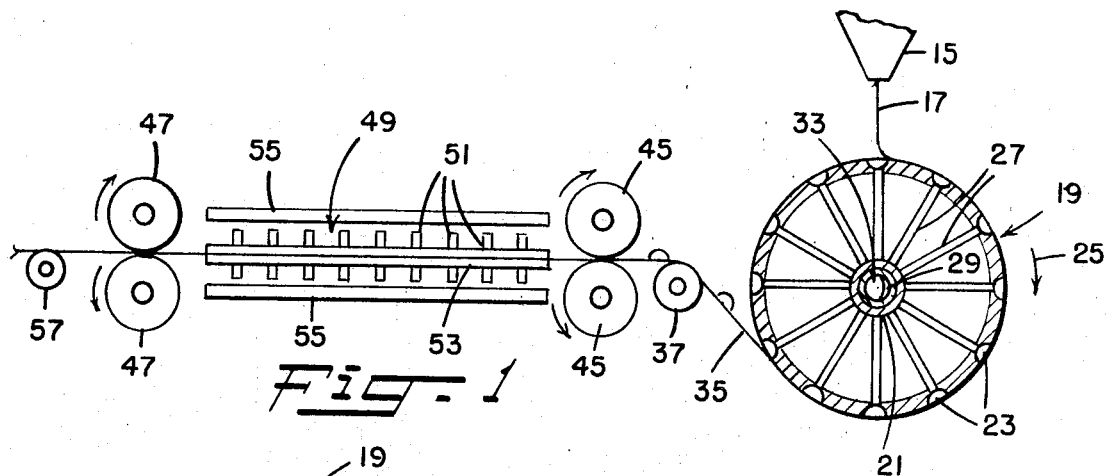
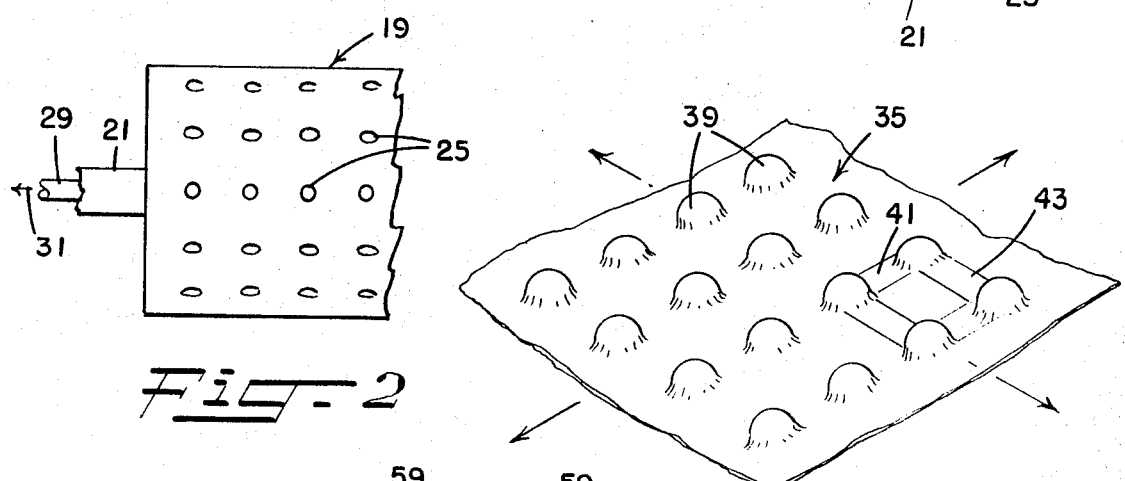
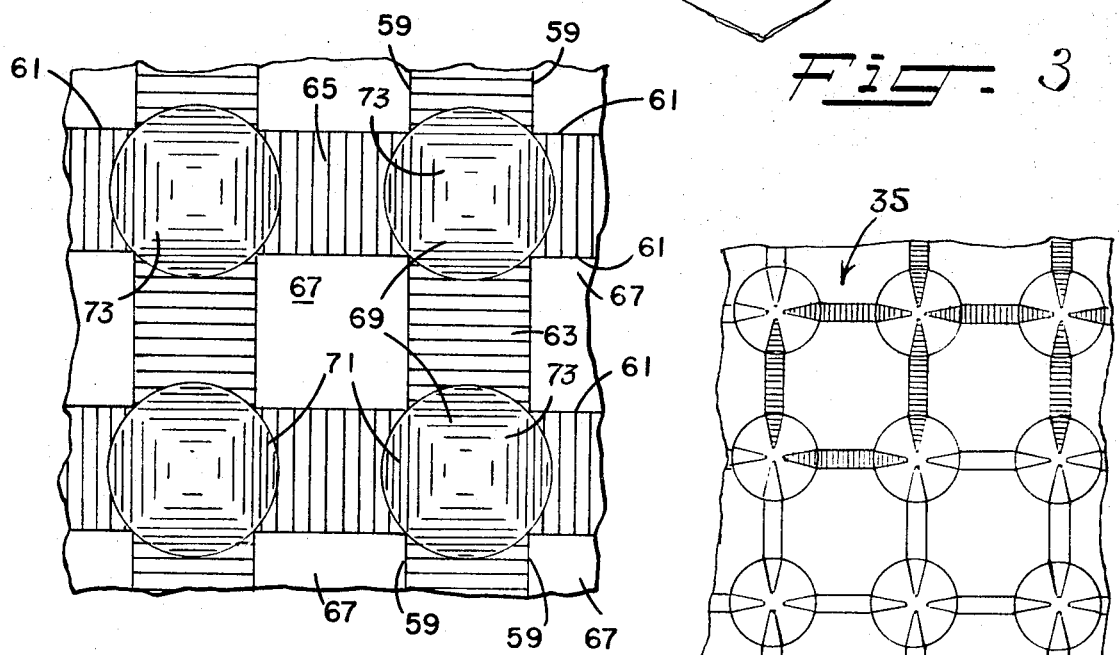

United States Patent Office 3,682,760
Patented Aug. 8, 1972

3,682,760
ORIENTED WEBS AND METHOD FOR MAKING THE SAME
Theodore H. Fairbanks, R.D. 1, Liverpool, Pa. 17045
Continuation-in-part of application Ser. No. 784,378, Dec. 17, 1968. This application Oct. 8, 1970, Ser. No. 79,050
Int. Cl. B29c 17/02, 17/04; B29d 7/24; B32b 3/30
U.S. Cl. 161—123                                   8 Claims

ABSTRACT OF THE DISCLOSURE

Manufacture of an unbroken polymeric web or film having a predetermined pattern of generally unoriented and uniaxially oriented regions.

---

This application is a continuation-in-part of my application Ser. No. 784,378, filed Dec. 17, 1968, now abandoned.

The present invention relates to an improved web or film having high strength, stiffness and tear-resistant properties.

United States Pat. 3,386,876, issued to H. W. Wyckoff, describes a film having desirable strength, stiffness and tear-resistant characteristics which is formed by providing a preformed film of orientable, thermoplastic polymeric material with a predetermined pattern of specially-treated areas, so as to shape the film portions between such specially-treated areas into ribs each having a narrow part and being of greatest width at its ends, and thereafter stretching such treated film along at least one of its biaxial directions. In the structure which results there are uniaxially drawn ribs which are separated at their ends by undrawn junctions, and either open or unoriented regions extending between adjacent of the uniaxially drawn ribs.

With the teachings of the above-noted patent being carried still further, United States Pats. 3,255,065 and 3,405,027, also issued to H. W.Wyckoff, disclose laminated structures which not only have uniaxially drawn ribs which are separated at their ends by undrawn junctions but also biaxially oriented regions extending between adjacent of such uniaxially drawn ribs.

A primary object of the present invention is to provide an improved method, which employs certain teachings of the above-noted patents, for providing a new or improved and more satisfactory web or film having a predetermined array of oriented and unoriented regions which impart desired strength, stiffness and tear-resistance thereto.

Another object is the provision of an improved continuous, unbroken web or film having only uniaxlly oriented areas which are separated by unoriented regions, and a method for making the same.

Still another object of this invention is the provision of a web or film having spaced uniaxially oriented areas, along each of which areas the degree of orientation varies, and a method for making such web or film.

A further object is to provide a web or film having uniaxially oriented areas which are separated from each other by generally radiating unoriented regions.

A still further object is the provision of a method for making continuous, unbroken webs or films having selectively spaced uniaxially oriented areas and an almost continuous network of unoriented regions.

The above and other objects of this invention are achieved by a method in which selected spaced areas of an extruded, flat, unbroken stream of orientable, flowable film-forming polymeric material are urged out of the surface of such extruded stream while the material thereof is still in a flowable condition and without interrupting the unbroken continuity of the stream. This stream is then set to thus provide an unoriented web or film in which the selected spaced areas, which were heretofore urged out of the surface of the extruded stream, appear as unbroken projections. Thereafter, this web or film is stretched along biaxial directions.

Following the teachings of the above-noted patents to H. W. Wyckoff, the selected spaced areas which are urged out of the surface of the extruded flat stream of flowable film-forming material in the method of the present invention are of such configurations and spacing that, in the resulting unstretched web or film, the portions between adjacent projections are each in the shape of a rib having a narrow part and being of greatest width at its ends. More particularly, and as more fully described in United States Pat. 3,386,876, the ribs provided in the unoriented web or film employed in the present invention must be such that the ribs which are to draw in parallel with each other must be capable of being drawn to substantially the same amount. Further, the ribs which are to be drawn in series with each other must be of comparable cross-section so that stretching will be initiated in a group of undrawn ribs after drawing is completed in an adjacent group of ribs and before such drawn ribs are stretched beyond their breaking point or a predetermined point compatible with other drawing which is to be performed.

Preferably, the ratio of the widest part of each of the ribs of the unoriented web or film to the narrowest part thereof, which is referred to as the width ratio, is substantially equal to or slightly greater than the ratio of the load required to cause such rib to yield and the load which must be applied to continue drawing of a rib once it has yielded.

With these requirements being satisfied, stretching of the unoriented web or film along biaxial directions, either independently or simultaneously, causes a group of parallel ribs to yield initially at their narrowest parts and thereafter continue to draw progressively in opposite directions therefrom. As drawing of such group of parallel ribs progresses into the wider parts thereof, the force necessary to maintain this drawing action also increases until it equals and exceeds the force under which undrawn ribs in series therewith yield and start to stretch. Each group of parallel ribs is drawn to their maximum allowable extent; that is, without inducing stretching in the junctions between the ends of adjacent ribs, and when such condition is attained, the lines defining the ends of the respective drawn ribs, which lines are hereafter referred to as "draw-lines," will have approximately the maximum length possible without having the junctions between the ends of adjacent ribs stretched and without the draw lines of the ribs at the respective junctions cross or otherwise interfere with each other.

The above-described uniaxial orientation of the ribs of the web or film occurs also in the methods disclosed in the above-noted Wyckoff patents. However, the presence of spaced projections in the initially formed unoriented web or film serves to distinguish the method as well as the resulting oriented structure of the present invention from those disclosed in the prior art.

More particularly, and as heretofore mentioned, the flat extruded stream of flowable film-forming material, from which the unoriented web or film is formed, is treated so as to urge selected spaced areas out from the surface thereof, with the term "surface" being employed in its geometrical sense as a two-dimensional locus of points. Such treatment is effected while the film-forming material is still in a flowable condition and thus, when set into a web or film, neither the projections nor the portions heretofore described as ribs possess any significant molecular orientation. While the stream of flowable film-forming material is preferably of substantially uniform thickness when extruded, the selected spaced areas thereof, of course, become progressively thinner as they are urged out of the surface of such stream. In the resulting unoriented web or film, the walls of the respective projections are not only thinner than the remaining portions of the web or film but are of progressively reduced thickness in a direction extending away from such remaining portions of the web.

As distinguished from the selected spaced areas provided in the films employed in the methods disclosed in the above-noted Wyckoff patents, the projections in the unoriented web or film employed in the present invention yield as the heretofore described ribs are oriented during web stretching. However, being slack in compraison with the remainder of the web, the web projections flex and accommodate, in part, stretching tensions which are applied to the web for initiating and maintaining drawing of the ribs thereof. The walls of the web projections are, therefore, at all times subjected to stretching tensions of less magnitude than those applied to the web ribs. Thus, during web stretching the ribs and areas of the walls of the web projections which are directly adjacent to the respective ribs will be uniaxially oriented in the same direction but to different degrees. Moreover, the molecular orientation induced within the respective wall areas of the web projections will itself vary in degree, being at a maximum at a location adjacent to the narrowest part of the adjacent rib and gradually diminishing from such location in directions extending along the length of such rib and as well as in a direction generally perpendicular to the axis of such rib.

Insofar as each of the projections provided in the original unoriented web assists in defining a plurality of ribs and since each such rib and adjacent areas of the walls of such projections are together oriented in the same direction during web stretching, it will be apparent that some wall areas of the individual projections will be oriented along one axial direction of the web while other wall areas of such individual projections are oriented along another axial direction of the web. However, these oriented areas of the walls of each individual web projection are separated from each other by a radiating array of unoriented web regions. Thus, the orientation provided in each such wall area of an individual web projection does not interfere with the orientation in adjacent of such areas, even when the web itself is stretched to provide the ribs thereof with draw lines of approximately the maximum possible length.

The configuration of the selected spaced areas which are urged out of the surface of the extruded stream of flowable film-forming material are such as to insure that the projections in the resulting unoriented web or film are free of sharp corners at which stresses may concentrate during web stretching. Such areas may be, for example, circular, elliptical, polygonal with rounded corners or may be comprised of a series of arcuate lines which together define a contoured shape, such as of clover-leaf configuration. Preferably, the walls of each such web projection are of smooth arcuate contour.

All of the selected spaced areas of the extruded stream of flowable film-forming material are urged out of the surface of such stream to substantially the same degree which is such that the web is approximately flat once stretching thereof is completed. Obviously, if such selected spaced areas of the stream of flowable film-forming material are urged out of the surface of the extruded stream to an excessive degree, all the slack presented by the web projections will not be accommodated or removed during the desired web stretching. On the other hand, if these selected areas are urged out of the surface of the extruded stream to an insufficient degree, the different oriented wall areas of the individual web projections will not be separated by a radiating array of unoriented web regions and may even cause portions of such wall areas to be biaxially oriented.

As heretofore mentioned, the web employed in the method of the present invention is formed of an orientable polymeric material and the selected spaced areas are urged out of the surface of the extruded stream of such material while it is still in such condition so that no significant orientation of the polymer molecules occurs within such areas. For example, in an extruded stream of molten thermoplastic polymeric material, the selected spaced areas may be urged from the surface thereof while this material is still molten. While the method of the present invention is particularly well adapted for use with thermoplastic polymeric materials, such as polypropylene, polyethylene, polyesters, etc., it is also well suited for use with orientable polymeric film-forming materials which are set into solid webs by chemical reactions. For example, selected spaced areas may be urged out of the surface of an extruded stream of viscose prior to coagulation thereof after which the viscose may be coagulated into a web and the web then stretched prior to being regenerated.

The oriented areas of the webs or films of the present invention impart good strength and stiffness to such webs or films, while the remaining unoriented regions thereof serve to arrest tearing of such webs. Such webs are light in weight and are adapted for a variety of different uses, as for example, as protective covers or shields, article wrapping or bagging materials, inflatable structures and the like.

The apparatus employed in the method of the present invention includes means for extruding a continuous, flat, unbroken stream of flowable film-forming material, an endless moving support, such as a belt or roller, positioned to receive the flat unbroken stream of film-forming material on its surface as it issues from the extruding means and then set the same, such endless support having spaced depressions in its surface, means for applying a vacuum to each of such depressions at a predetermined time, and means for subsequently biaxially stretching the web or film which has been set on such moving support. The depressions in the moving surface are preferably of smooth, continuous arcuate contour.

For a greater understanding of this invention, reference is made to the following detailed description and drawing in which FIG. 1 is a diagrammatic side view of the apparatus employed in the method of the present invention;

FIG. 2 is a front view of a portion of a chill roller employed in the apparatus shown in FIG. 1;

FIG. 3 is a perspective view of a portion of an unoriented polymeric web formed in accordance with the method of the present invention;

FIG. 4 is a perspective view of the web shown in FIG. 3 after partial biaxial stretching of the same in accordance with the method of the present invention; and FIG. 5 is a plan view of the web shown in FIG. 4 after desired biaxial orientation thereof has been completed.

For a more detailed description of the method of the present invention, reference is made to FIG. 1 of the drawing wherein character 15 denotes a die or nozzle, which is part of a conventional extrusion system, from which is extruded a flat unbroken stream 17 of molten orientable thermoplastic polymeric material, such as polypropylene. The extruded stream 17 is preferably of uniform thickness and is received upon a chill roller 19 having a central, hollow rotatable shaft 21 and depressions or dimples 23 formed in its peripheral surface. The depressions 23 are substantially alike in both configuration and depth and are aligned longitudinally and circumferentially of the roller surface. The roller 19 is cooled by circulating a chilled liquid along its inside surface by any conventional means. A suitable drive, not shown, is also provided for continuously rotating the roller 19 at a uniform speed in the direction as indicated by the arrow 25.

The roller depressions 23 are each adapted to be evacuated through individual tubes 27 which open into the respective roller depressions 23, extend through the hollow shaft 21 and are connected to a conduit 29 which is positioned within the roller shaft 21. The conduit 29 rotates with the roller 19 and its shaft 21 and is connected to a suitable vacuum means as indicated by the arrow 31. Means, such as a stationary shield 33, relative to which the conduit 29 is rotated, may be positioned within such conduit 29 to close off the tubes 27 at locations where evacuation of the roller depressions 23 is not desired, as more fully described hereafter.

As the extruded stream 17 of molten thermoplastic material engages with the surface of the roller 19, the spaced areas thereof overlying or spanning the roller depressions 23 are drawn into and against the walls of such depressions by the vacuum drawn through the tubes 27 and conduit 29. The thermoplastic material of the stream 17 remains flowable for a period after its initial contact and during a portion of its arcuate travel with the chill roller 19 and it is during this period that selected areas of such stream 17 are drawn into the roller depressions 23. Further, upon initial contact with the chill roller 19 the areas of the stream which overly or span the chill roll depressions 23 undergo little cooling until they are drawn into such depressions by the applied vacuum. Thus, no significant molecular orientation occurs in any areas of the stream as it travels with the chill roll 19 and prior to its solidification into a self-supporting web which is indicated at 35.

With the assistance of a stripping roll 37, the unoriented web 35 is removed from the roller 19 and, as shown in FIG. 3, includes a plurality of like, equally spaced projections 39 and is of continuous or unbroken construction. The projections 39 define the areas of the extruded stream 17 of molten thermoplastic material which were drawn into the roller depressions 23 and thus such projections 35 conform with the configuration and spacing of such roller depressions.

In the embodiment of the apparatus illustrated, the roller depressions 23 are alike in shape and size and are equally spaced both circumferentially and longitudinally of the surface of the roller 19. The projections 39 formed within the roller depressions 23 are, therefore, of substantially like shape, being circular at their locations of attachment with the remainder of the web 35, and spaced equal distances from each other both longitudinally and transversely of such web. The portions of the web 35 between adjacent transversely and longitudinally aligned projections 39 are in the forms of ribs, as indicated at 41 and 43 in FIG. 3, with each such rib being narrowest at its center and wider at its ends.

In accordance with the teachings of the heretofore noted Wyckoff patents, the spacing of the roller depressions 23 is such as to provide the web ribs, which are defined by adjacent projections 39, with a necessary width ratio; that is, wherein the ratio of the widest parts of each rib to the narrowest part thereof is substantially equal to or slightly greater than the ratio of the yield load, at which a rib starts to draw, to the draw load or the load necessary to maintain drawing once it has yielded. If the spacing and size and/or shape of the web projections 39 are such as to provide the web ribs with a width ratio which exceeds or is substantially less than that as defined above difficulties may be encountered during web stretching and/or the resulting product may not possess the desired arrangement of uniaxially oriented areas, as more fully described in the Wyckoff patents.

Once stripped from the chill roll 19 the web 35 is stretched along biaxial directions, either simultaneously or in separate stages, preferably while being heated to an orientation temperature range for the particular polymeric material from which the web 35 is formed and in a manner as described in the above-noted Wyckoff patents. With the apparatus shown in FIG. 1, the web 35 is stretched simultaneously along biaxial directions. More particularly, from the stripping roll 37, the web 35 travels between spaced pairs of nip rolls 45 and 47 which are rotated in the directions as indicated by arrows, but with the nip rolls 47 moving at a more rapid rate than the rolls 45 so as to induce longitudinal stretching of the web.

During travel between the pairs of nip rolls 45 and 47, the web 35 is also stretched in a transverse direction by a conventional means, such as a tenter frame, which is indicated generally at 49. Such means 49 includes clips 51 for gripping the opposite longitudinal edges of the web 35 and guides 53 for directing the clips, which are engaged with the opposite web edges, along diverging paths as they move from the nip rolls 45 toward the nip rolls 47. The clips 51 are advanced along these diverging paths at progressively increasing speeds, as determined by the longitudinal stretching forces exerted upon the web 35 by the nip rolls 47. Infrared heaters 55 are provided for heating the web 35 to a desired orientation temperature during its stretching and a chill roll 57 may be provided for cooling the web after stretching thereof has been completed.

In response to the stretching forces applied to the web 35, and as described in the Wyckoff patents, the groups of parallel ribs are sequentially drawn, with the individual ribs initially yielding at their narrowest part, and with the drawing of one group of parallel ribs being substantially completed before drawing is initiated in a group of parallel ribs in series therewith. For example, referring to FIG. 3, the row of parallel ribs including the ribs indicated at 41 and extending longitudinally of the web 35 would all yield at their narrowest parts or middle sections in response to longitudinal stretching forces applied to the web 35 and then continue to be progressively drawn in opposite directions therefrom, as indicated in FIG. 4.

As this drawing action proceeds, it extends into the wider portions of the individual ribs 41 of this group of parallel ribs and the stretching load is increased until such ribs are stretched to provide draw lines 59 as indicated in FIG. 5. At this stage the applied stretching forces at least equal or exceed the load under which the ribs 41, in a group of parallel ribs adjacent to and in series with those ribs 41 just stretched, start to yield. Drawing of the ribs 41 in the first mentioned group of parallel ribs thus ceases and the ribs 41 in the second mentioned group of parallel ribs continues until they also have draw lines as indicated at 59.

In response to stretching forces applied transversely of the web 35, the ribs 43 will undergo stretching as described above, with the ribs 43 in each group of such parallel ribs being stretched to provide draw lines as indicated at 61. In both the longitudinal and transverse stretching of the web 35 the drawing action is self-regulating in that the load required to continue drawing of a rib beyond its widest part, as indicated by draw-lines 59 and 61, is greater than the load under which an undrawn rib in series therewith will yield at its narrowest part.

Stretching of the web 35 as described above will, of course, enlarge the areas of the web which were originally defined by the ribs 41 and 43 and uniaxially orient the molecules in such areas in the respective directions of stretching. Thus, in FIG. 5, the stretched areas originally defined by ribs 41 and 43 have been designated by characters 63 and 65, respectively. Such areas 63 and 65 have also been shaded with lines extending in the direction in which the molecules in the respective areas have been uniaxially oriented. Regions of the web 35 indicated by the character 67, and referred to as junctions between the ends of uniaxially drawn ribs, remain unstretched.

Stretched concomitantly with the uniaxial orientation of the web ribs 41 and 43, are wall areas of the web projections 39. Thus, as an individual web rib 41 is drawn to provide an oriented area 63, the web projections 39 defining such individual rib 41 are also drawn along wall areas 69. As indicated by shade lines in FIG. 5, the polymeric molecules in the areas 69 are uniaxially oriented in the same directions as those of the areas 63. Similarly, with the drawing of the individual web ribs 43, wall areas 71 of the respective web projections 39 are also uniaxially oriented in the same direction as the areas 65, as indicated by shade lines.

Of particular significance is that in the original, unoriented web 35, the web projections 39 are slack relative to the remainder of such web. As a result, stretching tensions applied to the web 35 are never fully experienced by the web projections 39. More particularly, applied stretching tensions which are sufficient to initiate and maintain drawing of the web ribs 41 and 43 are in part accommodated by a flexing of the web projections 39 so that drawing along the wall areas 69 and 71 of these projections 39 lags, in both time and extent, the drawing which occurs along the web ribs. As the ribs 41 and 43 are stretched, the projection wall areas 69 and 71 will also be drawn, yielding initially at a location directly adjacent to the narrowest part of the respective ribs and extending from such locations progresively in directions generally parallel and perpendicular to the longitudinal axes of such ribs. The degree of uniaxial orientation provided along these wall areas 69 and 71 is always less than that of the areas 65 and 69 and is itself of varying magnitude, being a maximum at a location adjacent to the narrowest part of the web ribs and tapering off toward the edges of such areas.

In view of the lagging response of the wall areas 69 and 71 of the web projection 39 to the stretching forces, regions of such projections remain unoriented when the ribs 41 and 43 have been stretched to their maximum degree, as indicated by the draw lines 59 and 61. This unoriented region of the walls of the web projections 39 are indicated at 73.

As heretofore mentioned, the projections 39 which are provided in the original unoriented web are such that the slack present therein is for the most part completely removed during the stretching so that the finished web is at least approximately flat. Thus, in the finished web, the uniaxially oriented areas 63 and 65 are separated at their ends by undrawn junctions 67, the areas 69 and 71 are uniaxially oriented in the same directions as the respective areas 63 and 65 adjacent thereto but with each such area 69 and 71 having a varying degree of orientation, and unoriented regions 73 maintain the oriented areas 69 and 71 separated from each other.

It is to be understood that changes and variations may be made without departing from the spirit and scope of the invention as defined in the appended claims.

I claim:

1. A method of making a web of polymeric material having a predetermined pattern of molecularly oriented portions including the steps of extruding a flat, unbroken stream of flowable, orientable film-forming material, urging selected spaced areas of the extruded flat stream out of the surface of such stream without interrupting the continuity thereof and while the material is still in a flowable condition, setting the extruded stream whereby an oriented web having selected spaced projections is provided, the selected spaced areas which are urged out of the surface of the extruded flat stream of flowable film-forming material having such configurations and spacing that in the resulting web the regions thereof between adjacent projections are each in the shape of a rib having a narrow part and being wider at its ends, with the ratio of the widest and narrowest parts of such ribs being at least equal to the ratio required to initiate drawing of such ribs and the load necessary for maintaining the drawing thereof after such ribs have yielded when the web is subjected to stretching forces, and stretching the unoriented web along biaxial directions to uniaxiliary draw at least certain of the ribs along substantially their entire lengths without inducing stretching in the web portions between the ends of adjacent ribs.

2. A method as defined in claim 1 wherein the selected spaced areas are of such configuration as to shape regions of the web between adjacent of the projections into ribs which draw in parallel relationship and substantially to the same degree during the stretching of the web.

3. A method as defined in claim 1 wherein substantially all slack present in the web projection is removed during the biaxial stretching of such web.

4. A method as defined in claim 3 wherein lines defining the ends of the uniaxially drawn ribs which terminate at common undrawn web portions do not intersect with each other.

5. A method as defined in claim 1 wherein said flowable film-forming material is viscose and wherein the selected spaced areas of the extruded stream are urged out of the surface of the stream prior to coagulation thereof and the regions are stretched after the extruded streams of film-forming material has been coagulated but prior to regeneration of the same.

6. A generally flat web formed of orientable polymeric material, said web having uniaxially drawn ribs which are separated from each other by undrawn portions, areas adjacent to each such drawn rib which are uniaxially oriented in the same direction as such adjacent rib, and undrawn regions separating the uniaxially oriented areas from each other.

7. A web as defined in claim 6 wherein lines defining the ends of drawn ribs which terminate at a common undrawn portion do not intersect with each other.

8. A web as defined in claim 6 wherein the degree of orientation along said areas varies progressively from a maximum at a location near the drawn rib adjacent thereto to a minimum along th eedges thereof.

References Cited

UNITED STATES PATENTS 3,386,876   6/1968   Wyckoff _____ 161—109

WILLIAM A. POWELL, Primary Examiner

U.S. Cl. X.R.

18—4, 19; 161—166, 402; 264—90, 167, 210, 289, 291

PO-1050
(5/69)

UNITED STATES PATENT OFFICE
CERTIFICATE OF CORRECTION

Patent No. 3,682,760      Dated 8/8/72

Inventor(s) Theodore H. Fairbanks

It is certified that error appears in the above-identified patent and that said Letters Patent are hereby corrected as shown below:

Col. 1, line 4, after "17045" add -- , assignor to FMC Corporation, Philadelphia, Pa. --  Col. 7, line 21, "progresive-" should read -- progressive- --  Col. 8, line 49 "th eedges" should read -- the edges --.

Signed and sealed this 23rd day of January 1973.

(SEAL)
Attest:

EDWARD M. FLETCHER, JR.                    ROBERT GOTTSCHALK
Attesting Officer                                Commissioner of Patents